(12) United States Patent
Speight et al.

(10) Patent No.: US 7,958,316 B2
(45) Date of Patent: Jun. 7, 2011

(54) DYNAMIC ADJUSTMENT OF PREFETCH STREAM PRIORITY

(75) Inventors: William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 12/024,411

(22) Filed: Feb. 1, 2008

(65) Prior Publication Data

US 2009/0198907 A1 Aug. 6, 2009

(51) Int. Cl.
*G06F 12/12* (2006.01)
*G06F 5/12* (2006.01)
(52) U.S. Cl. ............ 711/137; 712/225; 711/E12.004
(58) Field of Classification Search .......... None
See application file for complete search history.

(56) References Cited

U.S. PATENT DOCUMENTS

| | | | |
|---|---|---|---|
| 2006/0095677 A1* | 5/2006 | Hakura et al. | 711/137 |
| 2006/0248280 A1* | 11/2006 | Al-Sukhni et al. | 711/137 |
| 2007/0043907 A1* | 2/2007 | Diefendorff | 711/137 |
| 2007/0283101 A1* | 12/2007 | El-Essawy et al. | 711/137 |
| 2007/0294482 A1* | 12/2007 | Kadambi et al. | 711/137 |
| 2009/0049256 A1* | 2/2009 | Hughes et al. | 711/158 |

* cited by examiner

*Primary Examiner* — Matt Kim
*Assistant Examiner* — Hal Schnee
(74) *Attorney, Agent, or Firm* — Dillon & Yudell LLP

(57) ABSTRACT

A method, processor, and data processing system for dynamically adjusting a prefetch stream priority based on the consumption rate of the data by the processor. The method includes a prefetch engine issuing a prefetch request of a first prefetch stream to fetch one or more data from the memory subsystem. The first prefetch stream has a first assigned priority that determines a relative order for scheduling prefetch requests of the first prefetch stream relative to other prefetch requests of other prefetch streams. Based on the receipt of a processor demand for the data before the data returns to the cache or return of the data along time before the receiving the processor demand, logic of the prefetch engine dynamically changes the first assigned priority to a second higher or lower priority, which priority is subsequently utilized to schedule and issue a next prefetch request of the first prefetch stream.

16 Claims, 5 Drawing Sheets

310

| | ROUND ROBIN PRIORITY ALLOCATION QUEUE (AT T1) | | | | |
|---|---|---|---|---|---|
| | 305 | | | | |
| | | | | 300 | |
| 2 | STREAM A | ADDR | STRIDE | STATE | ... |
| 2 | STREAM B | ADDR | STRIDE | STATE | ... |
| 2 | STREAM C | ADDR | STRIDE | STATE | ... |

*Fig. 3A*

| 1 | STREAM B | ADDR | STRIDE | STATE | ... |
|---|---|---|---|---|---|

| | ROUND ROBIN PRIORITY ALLOCATION QUEUE (AT T3) | | | | |
|---|---|---|---|---|---|
| | 305 | | | | |
| | | | | 305 | |
| 2 | STREAM A | ADDR | STRIDE | STATE | ... |
| 1 | STREAM B | ADDR | STRIDE | STATE | ... |
| 2 | STREAM C | ADDR | STRIDE | STATE | ... |

| | ROUND ROBIN PRIORITY ALLOCATION QUEUE (AT T4) | | | | |
|---|---|---|---|---|---|
| | 305 | | | | |
| | | | | 305 | |
| 1 | STREAM B | ADDR | STRIDE | STATE | ... |
| 2 | STREAM A | ADDR | STRIDE | STATE | ... |
| 1 | STREAM B | ADDR | STRIDE | STATE | ... |

*Fig. 3D*

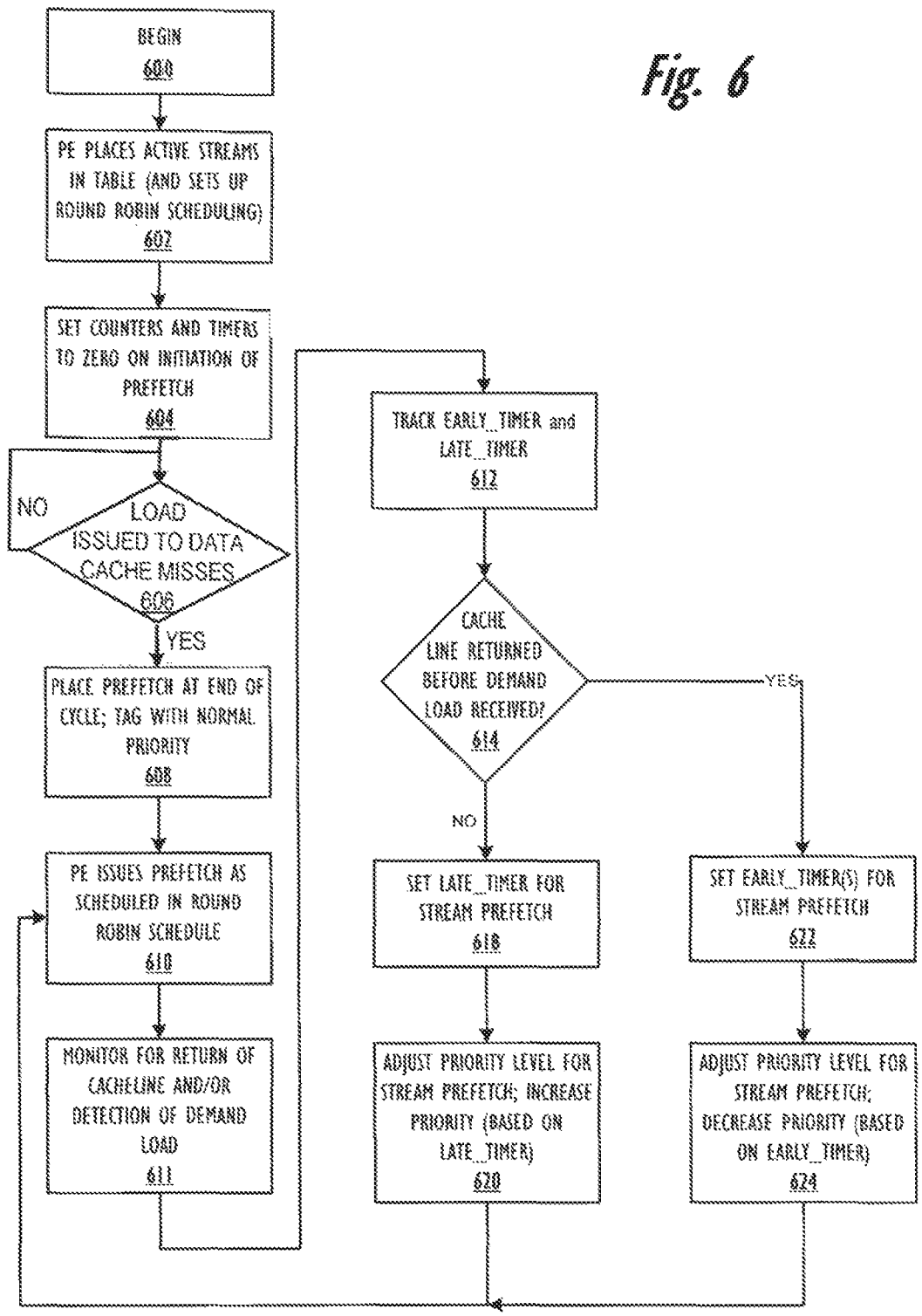

DYNAMIC ADJUSTMENT OF PREFETCH STREAM PRIORITY

GOVERNMENT RIGHTS

This invention was made with United States Government support under Agreement No. HR0011-07-9-0002 awarded by DARPA. The Government has certain rights in the invention.

BACKGROUND OF THE INVENTION

1. Technical Field

The present invention relates generally to data processing systems and more particularly to fetching data for utilization during data processing. Still more particularly, the present invention relates to data prefetching operations in a data processing system.

2. Description of Related Art

Prefetching of data during data processing is well-known in the art. Conventional computer systems are designed with a memory hierarchy comprising different memory devices with increasing access latency the further the device is away from the processor. The processors typically operate at a very high speed and are capable of executing instructions at such a fast rate that it is necessary to prefetch a sufficient number of cache lines of data from lower level (and/or system memory) to avoid the long latencies when a cache miss occurs. This prefetching ensures that the data is ready and available when needed for utilization by the processor.

Data prefetching is a proven, effective way to hide increasing memory latency from the processor's execution units. On these processors, data prefetch requests are issued as early as possible in order to "hide" the cache access latencies and thus allow ensuing dependent data operations (load requests) to execute with minimal delay in the return of data to the execution units. However, the early prefetching may results in an early/prematurely return, before the data are required/demanded by the execution units, and the cache line may be replaced in the cache/prefetch buffer before the fetched data is demanded by the processor. The processor then stalls, while waiting for the data to be fetched again.

Standard prefetch operations involve a prefetch engine that monitors accesses to the L1 cache and, based on the observed patterns, issues requests for data that is likely to be referenced in the future. If the prefetch request succeeds, the processor's request for data will be resolved by loading the data from the L1 cache on demand, rather than the processor stalling while waiting for the data to be fetched/returned from lower level memory.

When prefetching data, the prefetch engines utilize some set sequence for establishing the stream of cache lines to be fetched. For example, a large number of prefetch engines detect data streams that access cache lines in a sequential manner (e.g., cache line 5, followed by cache line 6, then cache line 7) or in a reverse sequence (cache line 7, followed by cache line 6, then cache line 5). Other prefetch engines, however, detect data streams that are referenced in "strides" (e.g., cache line 5 followed by cache line 8, then cache line 11, where the stride pattern is 3).

In order to track information about data streams (i.e., sequences of data references that are somehow correlated), the prefetch engines for some processor configurations, such as the POWER processors of International Business Machines, utilize a series of tables. Specifically, conventional prefetch engines utilizes two tables to track current streams of data, including a filter table to identify candidate streams, and a request table to hold currently active streams. Each table provides a queue for holding fetched cache lines, namely the prefetch filter queue and the prefetch request queue. When a miss to cache line A is detected, an entry in the filter table is allocated. If a miss to cache line A+1 follows, the "miss" information is now moved to the table that maintains information about current streams, and the prefetch engine will begin to issue requests for sequential cache lines (e.g., A+2, A+3 . . . ).

In some scenarios, only 1 access is required to start a stream. In these situations, some other metric may also be used to start the steam. For example, if the byte accessed is halfway or more through the cache line, the prefetch engine fetches the next line, and if the byte accessed is in the lower half of the cache line, the prefetch engine fetches the previous line. Since there are limited numbers of slots in the queues of both the filter and current stream tables, streams may write over other streams and cause prefetches in the replaced stream to stop.

Many modern processors concurrently execute different threads and/or branches within a thread, which require prefetching of different streams of data for each thread. With these types of processor and/or processor execution, the prefetch engine has to prefetch data for more than one stream. In some configurations, the prefetch engine performs the prefetching of the different streams in a round-robin manner. This round-robin implementation enables all streams to have consistently equal access to prefetched data. However, some streams are more important than others, particularly those streams whose load data are utilized sooner than the others. With the round-robin implementation, all streams are considered equal, which leads to potential misses for the streams with higher priority (i.e., streams whose data are utilized a faster rate). Misses may also occur due to data replacement in the small L1 cache for those slower streams whose data are not utilized quickly enough before being replaced by data from the next streams.

SUMMARY OF THE INVENTION

Disclosed are a method and data processing system for dynamically adjusting a prefetch stream priority based on the consumption rate of the data by the processor. The method includes a prefetch engine issuing a prefetch request of a first prefetch stream to fetch one or more data from the memory subsystem. The first prefetch stream has a first assigned priority that determines a relative order for scheduling prefetch requests of the first prefetch stream relative to other prefetch requests of other prefetch streams. The method also includes the prefetch engine monitoring a time between the issuance of the prefetch request and the occurrence of at least one trigger event from among: (a) a receipt of a processor demand for the data before a completion of the prefetch request; and (b) a receipt of the processor demand more than a pre-established minimum time after a return of the data by the prefetch request. Then based on the occurrence of one of the trigger events, logic of the prefetch engine dynamically changes the first assigned priority to a second priority. The prefetch engine then subsequently schedules and issues a next prefetch request of the first prefetch stream in a priority order indicated by the second priority.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 (3A-3D) provides a sequence of block diagrams representing a scheduling change within an example round-robin queue before and after a change in priority of one of the stream prefetches, according to one embodiment;

FIG. 6 is a high level logical flowchart of the method for completing priority-based round-robin scheduling of stream prefetches with dynamic adjustments to stream prefetch priority, in accordance with the described embodiment.

DETAILED DESCRIPTION OF AN ILLUSTRATIVE EMBODIMENT

The present invention provides a method and data processing system for enabling dynamic adjustment of a prefetch stream priority based on the consumption rate of the prefetched cache lines by the processor.

Figure 1:
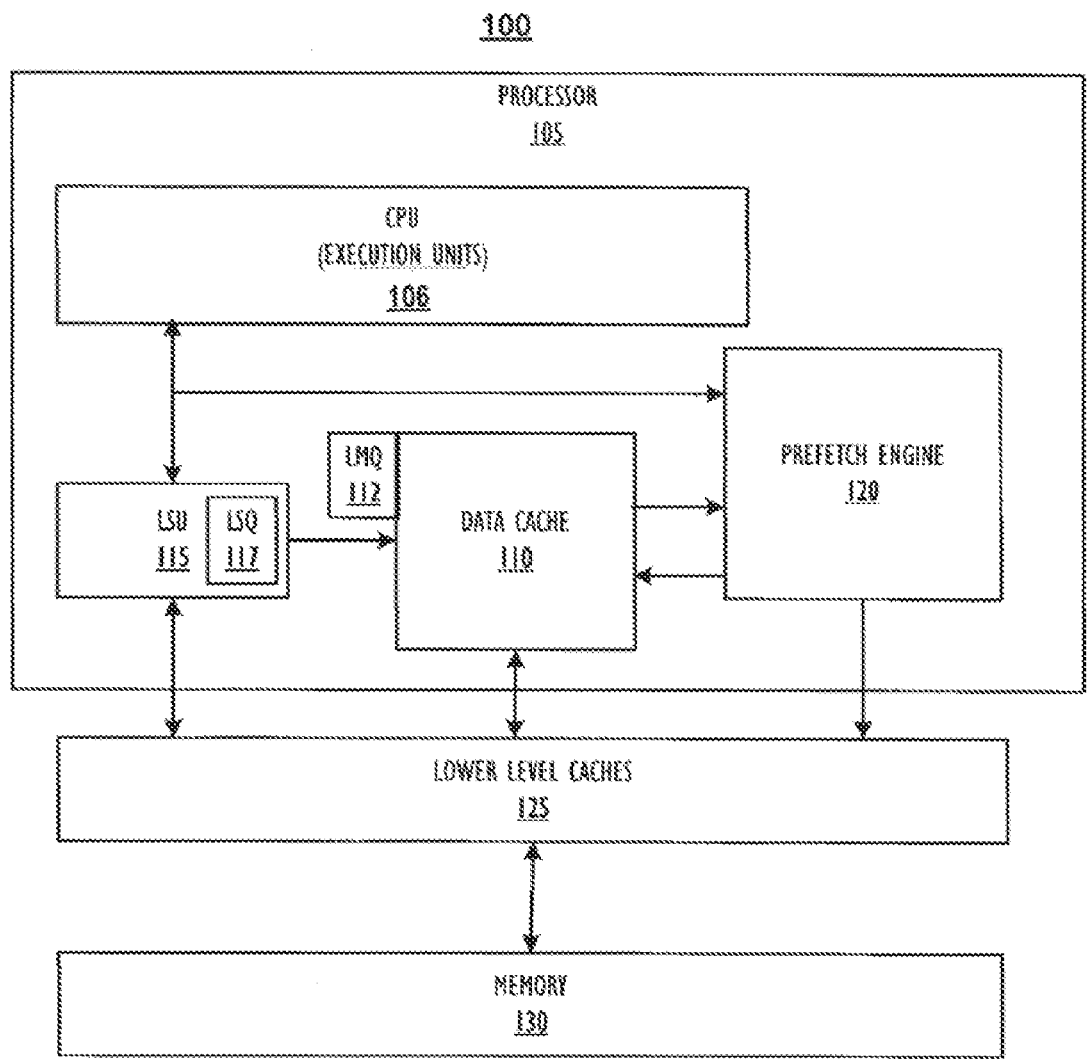
FIG. 1 is a block diagram of a data processing system with components utilized to complete a dynamic adjustment of data prefetch stream priority in accordance with one embodiment.

Referring now to the drawings and in particular to FIG. 1, there is depicted a block diagram of a data processing system, within which the various features of the invention may be implemented, in accordance with the described embodiments. Data processing system 100 comprises at least one central processing unit (CPU) 105. CPU 105 includes various execution units, registers, buffers, memories, and other functional units, which are all formed by integrated circuitry. More particularly, CPU 105 includes the various execution units 106 that request and consume data. In one embodiment of the present invention, CPU 105 is one of the PowerPC® line of microprocessors, which operates according to reduced instruction set computing (RISC) techniques.

CPU 105 connects to and communicates with a memory hierarchy that includes an L1 data cache (and prefetch buffer) 110, one or more lower level caches 125, and memory 130. CPU 105 communicates with each of the above devices within the memory hierarchy by various means, including via busses and/or direct channels. As described in greater detail below, L1 data cache 110 serves as a prefetch buffer for data (and/or data streams) that are prefetched. In the illustrative embodiment, L1 data cache has a corresponding load miss queue (LMQ) 112, which the cache utilizes to save ongoing prefetch requests. Lower level caches 125 may comprise a single level two (L2) cache or multiple other sequentially number lower levels, e.g., L3, L4. In addition to the illustrated memory hierarchy, data processing system 100 may also comprise additional storage devices that form a part of memory hierarchy from the perspective of CPU 105. The storage device may be one or more electronic storage media such as a floppy disk, hard drive, CD-ROM, or digital versatile disk (DVD).

Also illustrated coupled to CPU 105 are load store unit (LSU) 115, which includes a load/store queue (LSQ) 117, and a prefetch engine (PE) 120. PE 120 includes logic that enables the various enhanced prefetching features of the embodiments described herein. As utilized herein, the term prefetching refers to the method by which data that is stored in one memory location of the memory hierarchy (i.e., lower level caches 125 or memory 130) is transferred to a higher level memory location (i.e., L1 data cache 110) that is closer (yields lower access latency) to the CPU processor, before the data is actually requested/demanded by the processor. More specifically, prefetching as described hereinafter, refers to the early retrieval of data from one of the lower level caches/memory to the data cache (and prefetch buffer) 110 before the processor issues a demand for the specific data being returned.

During normal execution of program code, CPU 105 encounters and executes/issues a prefetch instruction before the CPU executes a load instruction associated with the same data. The prefetch instruction instructs the PE 120 to prefetch the data from the lower memory location and to store the data in the data cache 110. Subsequently, the CPU 105 executes the corresponding load (or other) instruction that instructs the CPU 105 to load the data from the data cache 110 into one of the CPU's execution registers. To load the data, the CPU 105 issues a memory access request (e.g., a read/write) to the data cache 110.

Those skilled in the art will further appreciate that there are other components that might be provided in conjunction with those shown in the block diagram of FIG. 1. For example, cache controller(s) and a memory controller may be utilized as interfaces between lower level caches 125 and memory device 130 and CPU 105, respectively. While a particular configuration of data processing system 100 is illustrated and described, it is understood that other configurations may be possible, utilizing functional components within and/or associated with the data processing system to achieve the same functional results. The illustrative embodiments contemplates that all such configurations fall within the scope of the embodiments and their equivalents.

Also, while an illustrative embodiment has been, and will continue to be, described in the context of a fully functional data processing system, those skilled in the art will appreciate that the software aspects of an illustrative embodiment are capable of being distributed as a program product in a variety of forms, and that an illustrative embodiment applies equally regardless of the particular type of media used to actually carry out the distribution.

Figure 2:
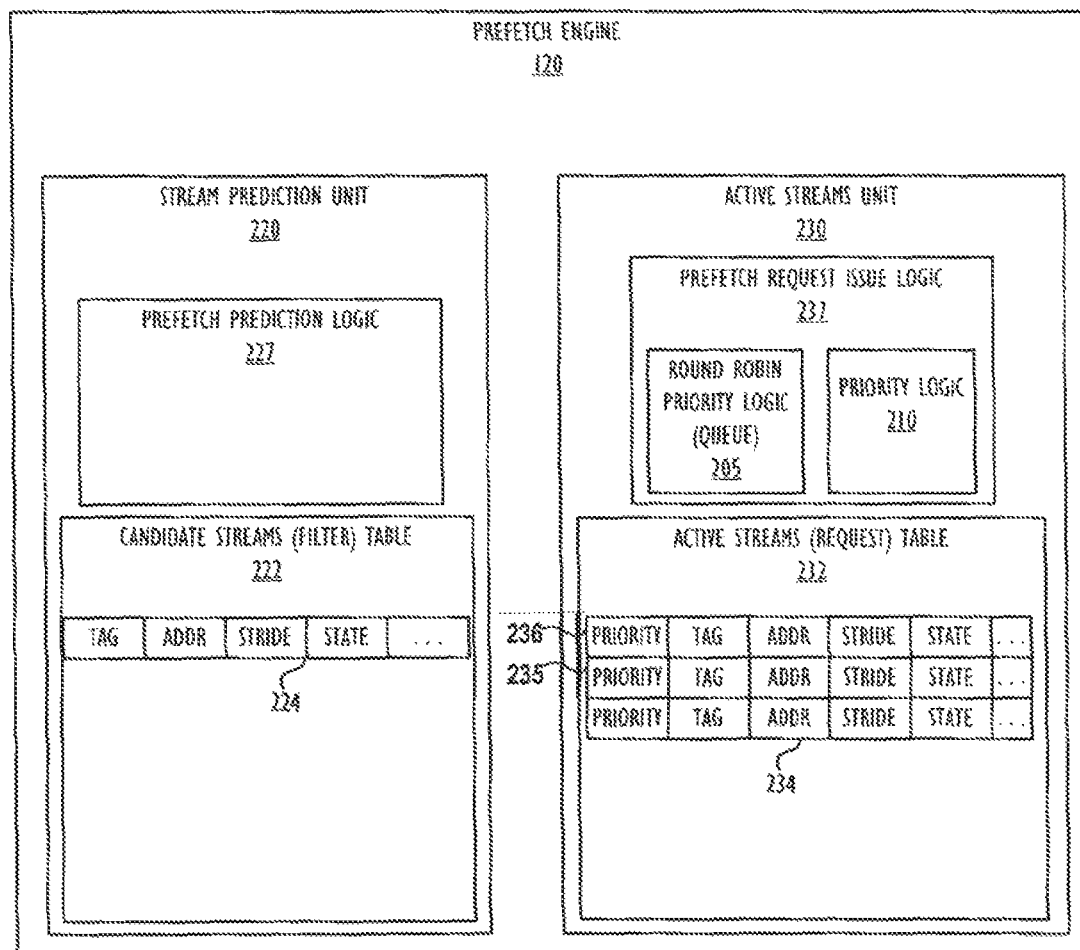
FIG. 2 is a block diagram depicting internal components of the prefetch engine of FIG. 1, according to one embodiment.

FIG. 2 is a block diagram illustrating additional logic components of an example prefetch engine (PE) 120 utilized for dynamically adjusting a prefetch stream priority while executing a round-robin scheme to prefetch multiple streams of data. PE 120 includes reference prediction unit 220, which includes reference prediction table 222 and reference/stream prediction logic 227. Reference prediction table 222 includes one or more entries of historical data 224 of previous references, which may be utilized by PE 120 to identify new streams for prefetching. Reference/stream prediction logic 227 utilizes the historical data entries 224 to predict future prefetch references based on issued references. Specifically, the reference/stream prediction logic 227 utilizes reference prediction table 222 to store a certain number of previous references in each entry and initiate an active stream in the issue logic if some pattern is detected.

PE 120 also includes active streams unit 230, which includes active streams table 232 and prefetch request issue logic 237. PE 120 is configured to concurrently maintain multiple separate, independent prefetch streams. Three entries of active streams information (i.e., entry 234, 235, and 236 for active prefetch requests) are illustrated within active stream table 232, representing different streams that the PE currently prefetches. According to the embodiments described herein, prefetch request issue logic 237 sends out prefetch requests at times determined by a round-robin scheme, modified by a priority assignment. For simplicity in describing the illustrative embodiments, the scheduling method described herein is hereinafter referred to as a "priority-based round-robin" scheduling scheme.

In the depicted embodiment, prefetch request issue logic 237 comprises (or is replaced by) two different functional logic. These two logics together enable the priority-based round-robin scheduling described herein. First (scheduling) logic 205 performs a round-robin allocation of streams for prefetching, while second (priority) logic 210 assigns a priority to one or more of the active prefetch streams and dynamically adjusts the priority for an active stream (and the position within the round-robin allocation) based on the rate at which the processor consumes the prefetched data of the active stream. The first logic 205 also adjusts the streams position within the round-robin schedule based on the stream's priority, such that higher priority streams are prefetched at a higher frequency (or prefetched before) a lower priority stream, where the PE 120 would normally have prefeteched the lower priority stream first, within the round-robin scheduling.

The second logic 210 determines the priority to assign to a particular prefetch stream (request) based on an evaluation of the current operating conditions of the processor, the prefetch return latency, and other parameters. In one embodiment, special counters/registers are maintained in the PE 120 and utilized to track the priority of the stream and/or determine when to adjust the priority of the stream(s), as described below in the description of FIG. 4.

The second logic 210 provides a priority value to one or more of the entries within the active streams table 232. Thus, as is further illustrated by FIG. 2, the entries include one or more priority bits to indicate/store the priority value for that stream. The second logic 210 dynamically adjusts the value within the priority bit based on the newly determined priority of the respective streams. Notably, when all streams have equal priorities, the first logic 205 does not adjust the position of the streams' prefetch relative to each other within the round-robin scheme.

Generally, during operation, the PE 120 performs a series of functions, including but not limited to: monitoring all read/write requests; receiving hit/miss information from the data cache 115; generating the multiple active prefetch requests based on pre-established rules; issuing the prefetch requests based on the combination of the established round-robin schedule and the priority assigned to the different streams being fetched via the round-robin schedule; and dynamically updating the issuing schedule based on changes to the priority of the streams relative to each other.

As utilized herein, the term logic 122 refers to one or a combination of software utility and/or pseudo code and hardware registers and components. The logic operates to ensure that data prefetch operation for a particular stream completes (i.e., returns the fetched cache line(s) to the data cache 115) at substantially the time (or clock cycle) at which the processor issues a demand for that cache line data. The functionality provided by the described and illustrated embodiments enables the data prefetch mechanisms within PE 120 to adapt quickly to changes in current operating conditions within the CPU 110 (e.g., speed of executing instructions/consuming data) so that the stream prefetch does not complete too late (or too early) during the next prefetch operation.

Refer now to FIG. 3 (3A-3D), which illustrates an example transition of the round-robin allocation of three example stream prefetch requests from a first allocation schedule to a second allocation schedule, based on a change in the priority of one of the stream prefetches relative to the others. For simplicity, the three stream prefetches are labeled Stream A, Stream B and Stream C, and are assumed to be issued by PE 120 in a cyclical, round-robin sequence (A, B, C), (A, B, C) from round-robin scheduling queue 305 when all have similar priorities (2). Priorities are assumed to be as follows: 1=high priority; 2=regular priority; and 3=low priority. Table A 310 represents scheduling Queue 305 with an initial allocation schedule with all prefetches having regular priority (2) at the initial time (T1).

As described above, the second logic 210 evaluates the rate of data consumption for the returned data of each stream. In the illustrative embodiment, the PE 120 determines that the processor consumes data from Stream B at a higher rate than data from Streams A and C, and the second logic 210 changes the priority value for Stream B. With Stream B having a higher priority value, first logic automatically schedules the prefetch request for Stream B to be issued at a faster frequency relative to the other two Streams within the round-robin allocation. Thus, as shown at Table B 320, the round-robin allocation with the scheduling queue 305 at time 2 (T2) is adjusted to inject Stream B into the cycle after the prefetch requests for each of the other two streams are issued. Table C 330 shows a continuation of the priority-based round-robin allocation at time 3 (T3).

The PE 120 utilizes second priority logic 210 to: (1) monitor a time (or spacing) between (a) return of data from an issued data prefetch of the data stream and (b) receipt of the processor demand for the data (i.e., the prefetch distance); (2) monitor the time between a first data request and a subsequent data request from the processor for that data stream; and (3) evaluate a priority to assign to the data stream prefetch based on the rate of usage of the previously fetched data. The scheduling logic 205 then performs the dynamic adjustments to the prefetching scheme to enable priority-based return of data to the data cache 110 for data streams, whose data the processor consumes at a faster rate. The described mechanism enables the prefetch distance to be dynamically increased and/or decreased, without requiring extra tag bits or extra states in caches.

According to the illustrative embodiment, the priority logic 210 of the PE 120 (i.e., not the cache) further includes a logic (hardware registers and software-enabled utility) by which the PE 120 keeps track of per-stream late and early prefetch requests. This logic enables the PE's prefetching logic (first logic) to dynamically adjust the prefetch distance to the optimal distance for the controlled return of the particular data cache lines of a particular data stream.

In executing the algorithm within the priority logic 110, the following parameters, presented with their respective definitions or uses, are utilized:

(1) distance: a prefetch distance, which has a fixed range of value and is prevented from going outside of the fixed range by dynamic adjustments provided by the algorithm.
(2) early_threshold: the number of minimum elapsed cycles required to consider a data prefetch early.
(3) increase_priority_threshold: the minimum number of late prefetches recorded to start increasing "distance" by assigning a higher priority to the stream's prefetch.
(4) decrease_priority_threshold: the minimum number of early prefetches recorded to start decreasing "distance" by assigning a lower priority to the stream's prefetch.
(5) priority scheduling adjustment (queue re-positioning step): the number of intervening, stream prefetches permitted between concurrent prefetches of a particular stream; lesser priority prefetches have a lager stride length (lower frequency of being issued within the round-robin allocation) than higher priority stream prefetches.

The specific parameters utilized within the described processes may have static values or dynamic values tailored to the underlying system. It is understood that the use of specific parameter names are for example only and not meant to imply any limitations on the invention. The invention may thus be implemented with different nomenclature/terminology utilized to described the above parameters, without limitation.

Figure 4:
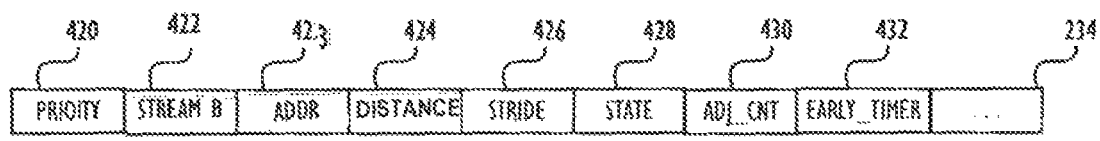
FIG. 4 is a block diagram representation of an example entry within the active streams table of the prefetch engine, in accordance with one embodiment.

Further, in order to support execution of the priority-based scheduling of prefetches, Two additional fields (register entries) may be added to the control structure of each instruction stream's prefetch. These two fields are: (1) "adjust_count", which records the number of late/early prefetches for the particular stream; and (2) "early_timer", which tracks the time elapsed between return/completion of the data prefetch and when the prefetched data/cache line is demanded/requested by the processor. FIG. 4 illustrates an example instruction stream prefetch 234 with several standard fields (register entries), namely stream ID 422, address field 423, distance field 424, stride field 426, and state field 428. Also illustrated are adjust_count field 430 and early_timer field 432, added to enable the tracking features performed by the priority logic within the PE 120. Notably, stream prefetch 234 also includes a priority field 420, in which the priority logic records the current priority assigned to the stream prefetch. The priority field 420 informs the scheduling logic of the priority of the particular stream prefetch.

With the adjust_count field, a zero value is preset as the desired norm for the stream, indicating that no adjustment is required to the current prefetch distance. Each late prefetch increases the value of adjust_count by a preset increment (e.g., 1) and each early prefetch decreases the value by a similar-sized preset decrement (i.e., 1). Thus, assuming a zero starting value, a positive value indicates that there are more late prefetches than early prefetches recorded for that data stream. Conversely, a negative value indicates that there are more early prefetches recorded than late prefetches.

Figure 5:
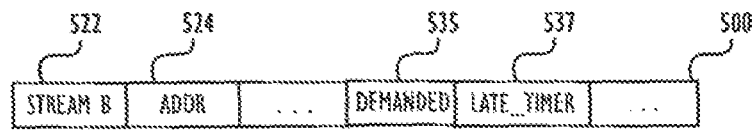
FIG. 5 is an example entry within the data cache's load request queue with alter-timer field, in accordance with one embodiment.

According to one embodiment, ongoing prefetch requests are saved within the cache's load miss queue (LMQ) 112 (FIG. 1). The LMQ is aware of when an ongoing, requested prefetch is late (i.e., early returns of a prefetch are not registered within the LMQ). The LMQ is designed to track the interval between the issuance of the request until when the request completes and the cache line is returned. This interval is referred to as the lateness interval and represented herein as "late_time". The late_time interval is tracked within a field within the LMQ. FIG. 5 illustrates an example LMQ entry 500 according to the present embodiment of the invention. As shown, in addition to the standard fields, e.g., stream ID 522 and address 524, LMQ entry 500 also comprises a demand field 535 and a late_timer field 537 in which the value of the late_time parameter is stored.

PE 120 tracks the intervals between issuance of the data prefetch and demand for the fetched data. This interval provides a sense of the "earliness" of the request, as opposed to the lateness interval tracked by the LMQ. The PE 120 completes this earliness tracking on a per-stream basis without requiring any modifications to the cache tags.

Referring specifically now to FIG. 6, which illustrates a high level flow chart of the method by which PE 120 provides priority-based round-robin scheduling of stream prefetches based on the real time rate of consumption of a stream's prefetched data by the processor. Generally, the method involves calculating an earliness and or lateness of each stream of multiple streams scheduled for round-robin prefetching and modifying the positions of the streams relative to each other within the round-robin schema. The PE implements a priority-based round-robin scheduling of stream prefetching that substantially eliminates late prefetching for higher priority streams, while prefetching data for other lower priority streams at the time the other streams require the data. In the described embodiment, the dynamic functionality is provided by scheduling logic 205 and priority logic 210 operating/executing within PE 120, and the method is described from the perspective of one or both of these logic components and the PE in general.

The method begins at block 600 and proceeds to block 602 at which the PE buffers a first set of active stream prefetches for priority-based round-robin scheduling. The illustrative embodiment of FIG. 2 provides a hardware mechanism (within the PE) that determines when a prefetch stream should be generated. However, one embodiment may provide a software method, whereby the software provides coded prefetches within the executing code, and the PE simply buffers the prefetches for scheduling via the priority-based round-robin method, as described herein. When the PE initially begins scheduling prefetches, the initial values of both adjust_count and early_timer of each new stream are set to zero (0), as shown at block 604. When the PE detects that a load issued to the data cache misses, the PE establishes a stream prefetch (assuming other conditions for establishing the prefetch are met), as shown at block 606. The scheduling logic places the stream prefetch at the end of the round-robin scheduling queue (or within the active streams table), as shown at block 608, and the priority logic assigns a default, regular priority to the new stream prefetch.

The PE issues the prefetch at block 610 at the regular schedule within the round-robin schedule. With the prefetch issued, the PE monitors for either the return of the cache line of data to the data cache or the detection of the demand load from the processor, as shown at block 611. Also, in the illustrated embodiment, at block 612, the priority logic tracks the early_timer and late_timer parameters for the corresponding streams, as the streams are prefetched.

If, as determined at block 614 the cache line data returns before the demand load is received, the PE updates an early_timer parameter that indicates the cache line may be arriving to early, as shown at block 622. With this updated value of early_timer parameter, priority logic may then change (decrease) the scheduling priority of the stream's prefetch, as shown at block 624. In an alternate embodiment, the PE sets a clock timer (at block 622) to check how much time elapses after the prefetched data arrives at the data cache before the processor consumes/requests the data. Then, when the PE detects the demand load, the PE stops the timer. With the actual value of elapsed time, the priority logic may then provide deterministic modifications to the priority changes made for the stream's prefetch. For example, for an elapsed time greater than a first threshold, the priority logic may decrease the priority value by one increment. However, for an elapsed time greater than a larger threshold, the priority logic may decrease the priority value by two or more increments. With this implementation, the PE continues to monitor for issuance by the processor of a demand load for the cache line data associated with the prefetched stream, and the time elapsed increases until the PE detects the demand load.

When the PE detects that the processor issued the demand load for the cache line data before the cache line data arrives at the data cache, the monitoring logic increments the late-timer parameter at block 618. The PE recognizes that the prefetch distance is too short, and that the prefetch has to be moved up in the round-robin scheduling. Thus, as shown at block 620, the PE (via the priority logic) changes (increases) the priority of the stream prefetch so that the scheduling logic will issue (schedule) the stream prefetch earlier in the round-robin cycle (or with a greater frequency within the cycle). The iteration of the process of priority-based round-robin scheduling of the prefetches by the scheduling logic then continues.

Similar to the alternate embodiment with the early_timer, in an alternate embodiment, the PE sets a clock timer (at block 614) to check how much time elapses between detection of the demand load and actual return of the prefetched data to the data cache. Then, when the PE detects the return of data, the PE stops the timer. With the actual value of elapsed time, the priority logic may then provide deterministic modifications to the priority changes made for the stream's prefetch. For example, for an elapsed time greater than a first threshold, the priority logic may increase the priority value by one increment. However, for an elapsed time greater than a larger threshold, the priority logic may increase the priority value by two or more increments. With this implementation, the PE continues to monitor for return of the data after detecting the demand load for the cache line data, and the time elapsed increases until the PE detects the return of the data.

When a stream prefetch has been tagged with a high priority and the PE does not detect one or more subsequently issued demand loads until some time after the previous one or more prefetch(es) return, then the priority logic may decreases the priority of the stream prefetch to normal priority. Also, as stated above, in one embodiment, the priority logic also tags a prefetch that returns at an early time period greater than a preset threshold with a low priority, to delay the scheduling of the subsequent stream's prefetch(es). The priority logic thus implements a dynamic process for assigning prefetching priority.

As described above, in one embodiment, a timer is used to determine the "earliness" and "lateness" of prefetch requests per stream. When a stream's prefetch request is sent out, if the demand load is seen before the prefetch returns, the prefetch is deemed "late". If the prefetch returns much earlier than the demand load for the cache line, the prefetch is "early", and the data may take up space in the cache that can be utilized for other, more immediately required data, which could result in the cache logic evicting the prefetched line from the cache before the data is utilized.

With the utilization of the priority bits associated with each prefetch stream, the PE (priority logic) raises the stream's prefetch priority when the PE detects an earlier/previous prefetch belonging to the stream was "late". Also, the PE (priority logic) lowers the priority when the previous prefetch was "early". The PE thus dynamically adjusts the order in which prefetches are requested based on the behavior of the respective prefetches during runtime.

An alternate embodiment of the invention provides a method by which the PE utilizes the adjust_count parameter and the increase_priority and decrease_priority parameters to influence priority changes only when a certain number of sequential prefetches of a particular stream have been early or late. With this embodiment, if the demand load does occur before the prefetch returns, a late prefetch is detected, and the PE 120 (or priority logic) increments the "adjust_Count" parameter by a pre-established increment value (e.g., 1). Then, the priority logic checks the new value of adjust_count to determine if the increment made adjust_count equal to or larger than the pre-established increase_priority parameter. If the value of adjust_count is greater than or equal to the increase_priority parameter, the priority value of the stream's prefetch is increased (i.e., the prefetch distance is increased) by some priority scheduling adjustment. Then the early_timer and/or late_timer are reset.

With this alternate embodiment, the priority assigned to the stream prefetch and/or the value of the priority scheduling adjustment may be determined based on the number of times the prefetch was early or late relative to preset thresholds. Thus with a four level priority scheme, for example, with priority 1 being the highest priority and priority 4 being the lowest, a prefetch that is late only once may cause a 3 priority to be changed to a 2 priority; However, a prefetch that is late two or more times (in sequence) may trigger a jump from a 3 priority to a 1 priority.

In one embodiment the PE further improves the outcome of the above processes by enabling the scheduling logic to begin with a small adjustment in scheduling position (e.g., move ahead one prefetch position), which provides a smaller misprediction penalty and also avoids unnecessarily early prefetches. Then, as the prefetching process continues, the scheduling logic dynamically increases the size of the priority scheduling adjustment (e.g., move up two prefetch positions on each cycle) after a preset number of prefetches are late. Alternatively, if a preset number of prefetches are early, the scheduling logic dynamically ramps down the priority scheduling adjustment, perhaps delaying the streams prefetch in the round-robin schedule. The scheduling logic (working in conjunction with the priority logic) thus prevents or substantially minimizes both late and early prefetches and enables the CPU to incur a substantially small amount (if any) of mis-prediction penalty.

It is important to note that although the present invention has been described in the context of a data processing system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. In data processing system comprising a processor, and a memory subsystem with at least one cache, a method comprising:
   issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;
   monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;
   dynamically changing the first assigned priority to a second priority when one of the trigger conditions occur, wherein the dynamically changing is implemented only after the receipt of the processor demand more than the pre-established minimum time after a return of the data by the prefetch request has occurred more than a second preset sequential number of times for the first prefetch stream; and subsequently scheduling and issuing a next prefetch request of the first prefetch stream in a priority order indicated by the second priority.

2. The method of claim 1, wherein said subsequently scheduling comprises scheduling prefetch requests of the first prefetch stream and at least one other prefetch stream in a priority-based round-robin scheme, wherein when all the prefetch streams have a same priority, the priority-based round-robin scheme schedules each prefetch stream in a set order whereby each prefetch stream is scheduled in a cyclical manner in a same sequencing order.

3. In data processing system comprising a processor, and a memory subsystem with at least one cache, a method comprising:

issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

dynamically changing the first assigned priority to a second priority when one of the trigger conditions occur; and subsequently scheduling and issuing a next prefetch request of the first prefetch stream in a priority order indicated by the second priority, wherein when the trigger event is the receipt of the processor demand more than the pre-established minimum time after a return of the data by the prefetch, said dynamically changing the first assigned priority comprises dynamically decreasing the priority of the first prefetch stream relative to the other prefetch streams, wherein the next prefetch request from the first prefetch stream is scheduled and issued after a previously assigned scheduling location relative to one or more of the other prefetch requests.

4. In data processing system comprising a processor, and a memory subsystem with at least one cache, a method comprising:

issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

dynamically changing the first assigned priority to a second priority when one of the trigger conditions occur; and subsequently scheduling and issuing a next prefetch request of the first prefetch stream in a priority order indicated by the second priority, wherein the dynamically changing the first priority comprises deterministically changing the first priority by an amount that correlates to the amount of time elapsed between the return of the data and the receipt of the demand load from the processor, wherein a longer time results in a larger change in the first priority.

5. A data processing system comprising:
a central processing unit that issues requests for data;
a memory subsystem having at least one lower level memory storage device and a cache that stores data;
a prefetch engine associated with the central processing unit and which includes:

logic for issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

logic for monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

logic for dynamically changing the first assigned priority to a second priority when one of the trigger conditions occur only after the receipt of the processor demand more than the pre-established minimum time after a return of the data by the prefetch request has occurred more than a second preset sequential number of times for the first prefetch stream; and logic for subsequently scheduling and issuing a next prefetch request of the first prefetch stream in a priority order indicated by the second priority.

6. The data processing system of claim 5, wherein said logic for subsequently scheduling comprises logic for scheduling prefetch requests of the first prefetch stream and at least one other prefetch stream in a priority-based round-robin scheme, wherein when all the prefetch streams have a same priority, the priority-based round-robin scheme schedules each prefetch stream in a set order whereby each prefetch stream is scheduled in a cyclical manner in a same sequencing order.

7. A data processing system comprising:
a central processing unit that issues requests for data;
a memory subsystem having at least one lower level memory storage device and a cache that stores data;
a prefetch engine associated with the central processing unit and which includes:

logic for issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

logic for monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

logic for dynamically changing the first assigned priority to a second priority when one of the trigger conditions occur; and logic for subsequently scheduling and issuing a next prefetch request of the first prefetch stream in a priority order indicated by the second priority, wherein when the trigger event is the receipt of the processor demand more than the pre-established minimum time after a return of the data by the prefetch, said logic for dynamically changing the first assigned priority comprises logic for dynamically decreasing the priority of the first prefetch stream relative to the other prefetch streams, wherein the next prefetch request from the first prefetch stream is scheduled and issued after a previously assigned scheduling location relative to one or more of the other prefetch requests.

8. A data processing system comprising:
a central processing unit that issues requests for data
a memory subsystem having at least one lower level memory storage device and a cache that stores data;
a prefetch engine associated with the central processing unit and which includes:
logic for issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

logic for monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

logic for dynamically changing the first assigned priority to a second priority when one of the trigger conditions occur; and logic for subsequently scheduling and issuing a next prefetch request of the first prefetch stream in a priority order indicated by the second priority, wherein the logic for dynamically changing the first priority comprises logic for deterministically changing the first priority by an amount that correlates to the amount of time elapsed between the return of the data and the receipt of the demand load from the processor, wherein a longer time results in a larger change in the first priority.

9. A computer program product comprising:
a tangible computer storage medium; and
program code on the computer storage medium for:
issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;
monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

dynamically changing the first assigned priority to a second priority when one of the trigger conditions occur, wherein the dynamically changing is implemented only after the receipt of the processor demand more than the pre-established minimum time after a return of the data by the prefetch request has occurred more than a second preset sequential number of times for the first prefetch stream; and subsequently scheduling and issuing a next prefetch request of the first prefetch stream in a priority order indicated by the second priority.

10. The computer program product of claim 9, wherein said code for subsequently scheduling comprises code for scheduling prefetch requests of the first prefetch stream and at least one other prefetch stream in a priority-based round-robin scheme, wherein when all the prefetch streams have a same priority, the priority-based round-robin scheme schedules each prefetch stream in a set order whereby each prefetch stream is scheduled in a cyclical manner in a same sequencing order.

11. A computer program product comprising:
a tangible computer storage medium; and
program code on the computer storage medium for:
issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;
monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;
dynamically changing the first assigned priority to a second priority when one of the trigger conditions occur; and
subsequently scheduling and issuing a next prefetch request of the first prefetch stream in a priority order indicated by the second priority, wherein:
when the trigger event is the receipt of the processor demand before the completion of the prefetch request, said program code for dynamically changing the first assigned priority comprises code for dynamically increasing the priority of the first prefetch stream relative to the other prefetch streams, wherein the next prefetch request from the first prefetch stream is scheduled and issued ahead of a previously assigned scheduling location relative to one or more of the other prefetch requests; and
when the trigger event is the receipt of the processor demand more than the pre-established minimum time after a return of the data by the prefetch, said program code for dynamically changing the first assigned priority comprises code for dynamically decreasing the priority of the first prefetch stream relative to the other prefetch streams, wherein the next prefetch request from the first prefetch stream is scheduled and issued after a previously assigned scheduling location relative to one or more of the other prefetch requests.

12. A computer program product comprising:
a tangible computer storage medium; and
program code on the computer storage medium for:

issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

dynamically changing the first assigned priority to a second priority when one of the trigger conditions occur; and subsequently scheduling and issuing a next prefetch request of the first prefetch stream in a priority order indicated by the second priority, wherein the code for dynamically changing the first priority comprises code for deterministically changing the first priority by an amount that correlates to the amount of time elapsed between the return of the data and the receipt of the demand load from the processor, wherein a longer time results in a larger change in the first priority.

13. A processor comprising:

execution units that issue requests for data;

an L1 cache for buffering data received from a memory subsystem during data processing operations; and a prefetch engine associated with the central processing unit and which includes:

logic for issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

logic for monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

logic for dynamically changing the first assigned priority to a second priority when one of the trigger conditions occur, wherein the dynamically changing is implemented only after the receipt of the processor demand more than the pre-established minimum time after a return of the data by the prefetch request has occurred more than a second preset sequential number of times for the first prefetch stream; and logic for subsequently scheduling and issuing a next prefetch request of the first prefetch stream in a priority order indicated by the second priority.

14. The processor of claim 13, wherein said logic for subsequently scheduling comprises logic for scheduling prefetch requests of the first prefetch stream and at least one other prefetch stream in a priority-based round-robin scheme, wherein when all the prefetch streams have a same priority, the priority-based round-robin scheme schedules each prefetch stream in a set order whereby each prefetch stream is scheduled in a cyclical manner in a same sequencing order.

15. A processor comprising:

execution units that issue requests for data;

an L1 cache for buffering data received from a memory subsystem during data processing operations; and a prefetch engine associated with the central processing unit and which includes:

logic for issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

logic for monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

logic for dynamically changing the first assigned priority to a second priority when one of the trigger conditions occur; and logic for subsequently scheduling and issuing a next prefetch request of the first prefetch stream in a priority order indicated by the second priority, wherein when the trigger event is the receipt of the processor demand more than the pre-established minimum time after a return of the data by the prefetch, said logic for dynamically changing the first assigned priority comprises logic for dynamically decreasing the priority of the first prefetch stream relative to the other prefetch streams, wherein the next prefetch request from the first prefetch stream is scheduled and issued after a previously assigned scheduling location relative to one or more of the other prefetch requests.

16. A processor comprising:

execution units that issue requests for data;

an L1 cache for buffering data received from a memory subsystem during data processing operations; and a prefetch engine associated with the central processing unit and which includes:

logic for issuing a prefetch request of a first prefetch stream having a first assigned priority to fetch one or more data from the memory subsystem, said first assigned priority being a priority that determines a relative order for scheduling prefetch requests of the first prefetch stream relative to other prefetch requests of other prefetch streams;

logic for monitoring a time between the issuance of the prefetch request and the occurrence of at least one trigger event from among (a) a receipt of a processor demand for the data before a completion of the prefetch request and (b) a receipt of the processor demand more than a pre-established minimum time after a return of the data by the prefetch request;

logic for dynamically changing the first assigned priority to a second priority when one of the trigger conditions occur; and logic for subsequently scheduling and issuing a next prefetch request of the first prefetch stream in a priority order indicated by the second priority, wherein the logic for dynamically changing the first priority comprises logic for deterministically changing the first priority by an amount that correlates to the amount of time elapsed between the return of the data and the receipt of the demand load from the processor, wherein a longer time results in a longer change in the first priority.

* * * * *